(12) United States Patent
Andrina

(10) Patent No.: US 12,404,914 B2
(45) Date of Patent: Sep. 2, 2025

(54) GEARBOX WITH GEARS WITH CONICAL COAXIAL FRONT TOOTHED WHEELS

(71) Applicant: CORIMAG S.R.L., Bosconero (IT)

(72) Inventor: Giovanni Andrina, Bosconero (IT)

(73) Assignee: CORIMAG S.R.L., Bosconero (IT)

( * ) Notice: Subject to any disclaimer, the term of this patent is extended or adjusted under 35 U.S.C. 154(b) by 0 days.

(21) Appl. No.: 18/832,407

(22) PCT Filed: Feb. 8, 2023

(86) PCT No.: PCT/IT2023/050034
§ 371 (c)(1),
(2) Date: Jul. 23, 2024

(87) PCT Pub. No.: WO2023/170716
PCT Pub. Date: Sep. 14, 2023

(65) Prior Publication Data
US 2025/0102047 A1    Mar. 27, 2025

(30) Foreign Application Priority Data
Mar. 10, 2022   (IT) .................. 102022000004529

(51) Int. Cl.
*F16H 3/00*   (2006.01)
*F16H 3/36*   (2006.01)
(Continued)

(52) U.S. Cl.
CPC ............. *F16H 3/363* (2013.01); *F16H 61/26* (2013.01); *F16H 61/32* (2013.01)

(58) Field of Classification Search
CPC .......... F16H 3/363; F16H 15/46; F16H 3/423; F16H 3/426; F16H 2055/173; F16H 15/12; F16H 3/366; F16H 61/26; F16H 61/32
See application file for complete search history.

(56) References Cited

U.S. PATENT DOCUMENTS 823,369 A    6/1906    Schroeder

FOREIGN PATENT DOCUMENTS

| CN | 108194584 A | 6/2018 | |
| DE | 102014016395 A1 * | 5/2016 | ............ B62M 11/04 |

(Continued)

OTHER PUBLICATIONS

International Search Report and Written Opinion of the International Searching Authority issued for International PCT Application No. PCT/IT2023/050034 on May 12, 2023.

*Primary Examiner* — Victor L Macarthur
(74) *Attorney, Agent, or Firm* — Howson & Howson LLP

(57) ABSTRACT

A gearbox (10) is provided and includes a driving wheel (4) and a driven wheel (3) rotating on a common axis (13) and a cursor (9) arranged transversally to the axis (13) and sliding with respect to it. The wheels (4, 3) have crown gears (5A, 5B) arranged on different diameters of the drive (4) and driven wheels (3). The crown gears (5A, 5B) have teeth protruding from facing surfaces (21, 22) of the wheels (4, 3). The cursor (9) has two gears (7A, 7B) arranged at its ends, rotating around the axis (19) of the cursor (9) and configured to transmit motion from the driving wheel (4) to the driven wheel (3), engaging each gear (7A, 7B) in respective crown gears (5A, 5B) of the driving wheels (4) and driven wheels (3). The cursor (9) slides inside a seat (15) made in the axis (13).

10 Claims, 3 Drawing Sheets

(51) Int. Cl.
*F16H 61/26* (2006.01)
*F16H 61/32* (2006.01)

(56) References Cited

FOREIGN PATENT DOCUMENTS

GB 193883 A 3/1923
IT PD20110381 A1 6/2013

* cited by examiner

GEARBOX WITH GEARS WITH CONICAL COAXIAL FRONT TOOTHED WHEELS

The present invention relates to a gearbox with coaxial front toothed wheels, in particular of a conical shape.

More specifically, the invention provides a gearbox with gears with coaxial front toothed wheels to be applied in all those uses which require, or prefer, a coaxial wheel arrangement, for example for integration into the hub of the driving wheel of a bicycle.

Gearboxes with gears are known in the art, in particular for use on a bicycle.

However, these known gearboxes are not satisfactory and have the problems of being relatively bulky, heavy, complex and of using mechanisms which are difficult to protect from dirt with a consequent decrease in reliability.

Object of the present invention is solving the aforesaid prior art problems by providing a gearbox with gears with coaxial front toothed wheels which is not bulky, simple to manufacture and reliable.

The aforesaid and other objects and advantages of the invention, as will appear from the following description, are achieved with a gearbox with gears with coaxial face gears such as the one described in claim 1. Preferred embodiments and non-trivial variants of the present invention form the subject of dependent claims.

It is understood that all attached claims form an integral part of the present description.

It will be immediately obvious that innumerable variations and modifications may be made to what is described (for example relating to shape, dimensions, arrangements and parts with equivalent functions) without departing from the scope of protection of the invention, as appears from the attached claims.

The present invention will be better described by some preferred embodiments thereof, provided by way of non-limiting example, with reference to the attached drawings, in which.

Figure 1:
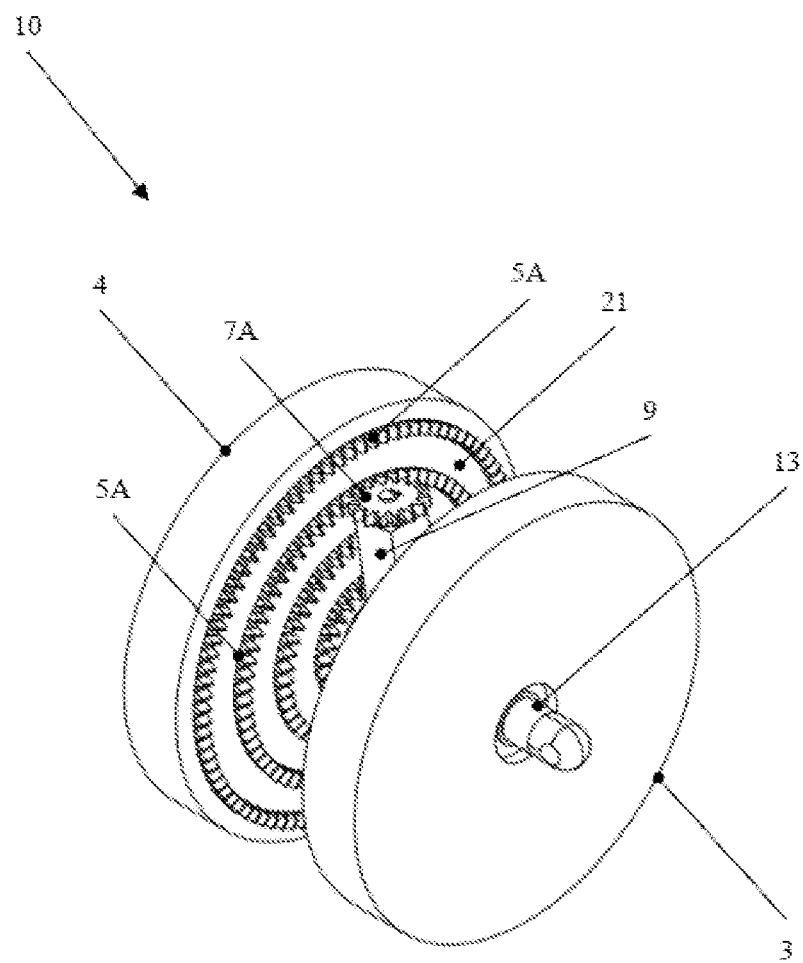
FIG. 1 is a perspective view of an embodiment of a gearbox with coaxial face gears according to the present invention.
Figure 2:
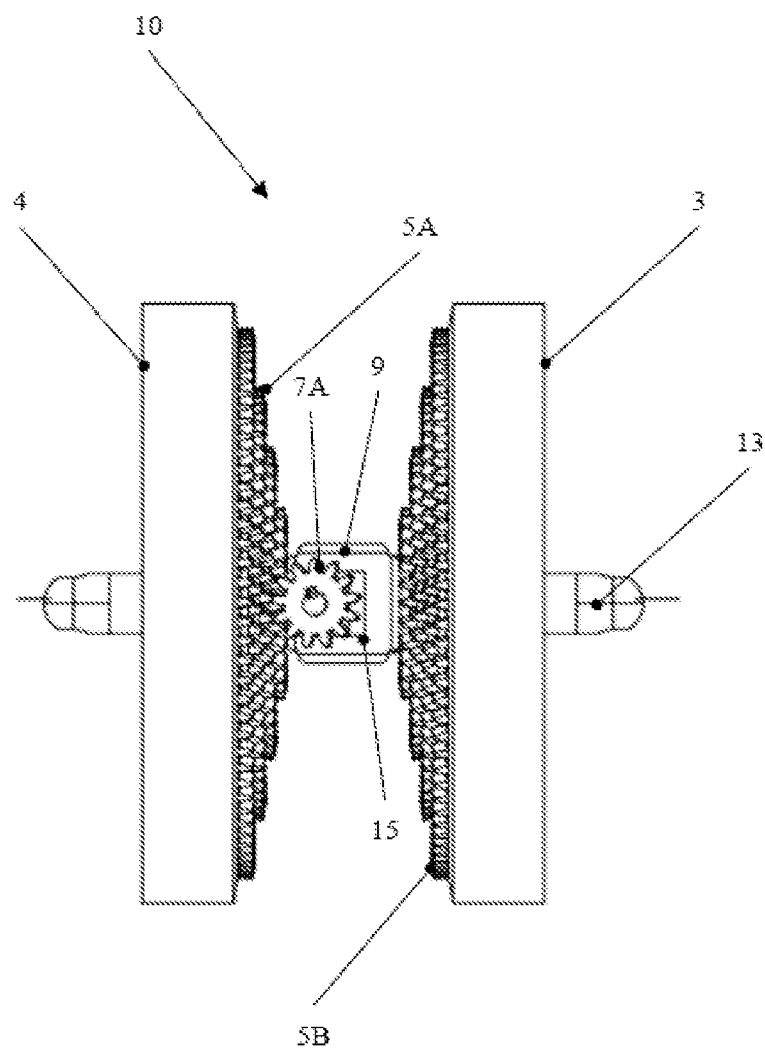
FIG. 2 is a top view of an embodiment of a gearbox with coaxial front gear wheels according to the present invention.
Figure 3:
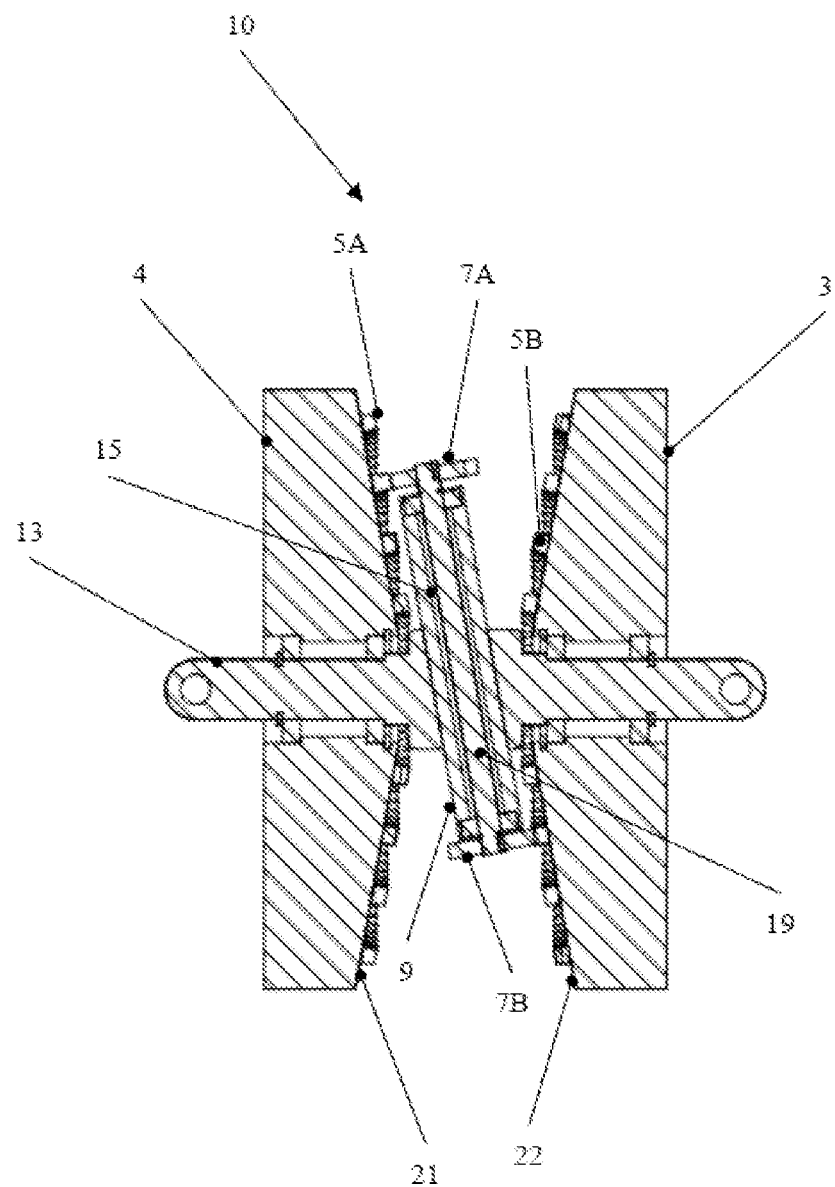
FIG. 3 is a sectional view of an embodiment of a gearbox with coaxial face gears according to the present invention.

With reference to the Figures, a preferred embodiment of the gearbox 10 with coaxial gear wheels of the present invention is illustrated and described; such gearbox 10 comprises a driving wheel 4 and a driven wheel 3 rotating on an axis 13, for example a fixed axis, and a cursor arranged transversely to the axis 13 and sliding with respect to it, preferably inside a seat 15 formed in the axis 13.

The gear wheels 4, 3 preferably comprise respective crown gears 5A, 5B arranged on different diameters of the driving wheels 4 and driven wheels 3, said crown gears 5A, 5B being made with teeth protruding from facing surfaces 21, 22 of the wheels 4, 3.

The cursor 9 also comprises two gears 7A, 7B arranged at its ends, said gears 7A, 7B being preferably integral with each other and fixed to the axis 19 of the cursor 9, rotating around it and configured to transmit the motion from the driving wheel 4 to the driven wheel 3, engaging each gear 7A, 7B in respective crown gears 5A, 5B arranged on different diameters of the driving wheel 4 and driven wheel 3.

Preferably, the surfaces 21, 22 of the drive 4 and driven 3 wheels are conical in shape, inclined with respect to their axis 13 by an angle α which is preferably equal to the angle of inclination of the axis 19 of the cursor 9, and the crown gears 5A, 5B are arranged on said surfaces 21, 22; in a preferred way, the driving wheels 4 and driven wheels 3 are specular.

In a first configuration of the gearbox 10 with gears with coaxial front gear wheels of the invention, the axis 13 is fixed and has the task of supporting the rotation of the driving wheels 4 and driven wheels 3 and of guiding the sliding of the cursor 9.

Other configurations of the invention are possible, in which the functions of the components can be exchanged or used in any other way, such as for example the movable driving wheel 4, the fixed wheel 3, the axis 13 can rotate together with the cursor 9 and the two gears 7A, 7B behave like satellites.

The operation of the gearbox with coaxial front gear wheels will be described below in the first configuration of the invention shown in the figures and described above.

In this configuration, the driving wheels 4 and the driven wheels 3 are specular, each comprising four crown gears 5A, 5B arranged on different diameters and made on the surfaces 21, 22 inclined by the angle α equal to the inclination angle of the axis 19 of the cursor 9, so as to allow the cursor 9 to slide and move radially with respect to the wheels 4, 3, and to bring the gears 7A, 7B integral with each other, to mesh with the crown gears 5A, 5B arranged on different diameters of the two wheels 4, 3, the first gear 7A meshed with the driving wheel 4 and the second gear 7B meshed with the driven wheel 3.

The inclination angle α of the axis 19 of the cursor 9 allows the gearbox to operate: in fact the cursor 9 can slide along its axis 19 to effect the change of ratio between the driving wheel 4 and the driven wheel 3, allowing the former gear 7A to mesh only with the crowns 5A of the driving wheel 4, without interfering with the driven wheel 3, and allowing the second gear 7B to mesh only with the crowns 5B of the driven wheel 3, without interfering with the driving wheel 4, which would prevent the gearbox from functioning, as is evident from the figures.

As a result, the driving wheel 4 transmits the motion to the first gear 7A, through one of the crowns 5A, which in turn transmits it to the second gear 7B which finally transmits it to the driven wheel 3, through one of the crowns 5B.

The gearbox with gears with coaxial front gear wheels of the invention further comprises means for controlling the axis 19 of the cursor 9, not shown in the figures, configured to move the cursor 9, when the ratio is required, upwards or downwards along its axis 19, moving it by a distance equal to the distance between the crowns 5A, 5B, obtaining a change in the rotation speed of the driven wheel 3 with respect to the driving wheel 4, increasing or reducing the speed of the driven wheel 3 depending on the cursor movement direction 9.

In the configuration just described, there are four crown gears 5A, 5B and they allow obtaining four ratios, but the number of crown gears varies according to the need for ratios and to the manufacturing skills.

The cursor 9 is designed to be moved by a cursor moving mechanism, which, according to a preferred embodiment, is housed in the central axis 13, which is usually fastened to the chassis, and therefore unmoving. This movement, necessary for changing the gear ratio, can be performed manually by means of levers, rack rods, gears, etc. (not shown), as well as by using a small electric motor, or sliding magnets, in order to make the gear ratio selection automatic.

Another important feature, made possible by the above described embodiment, is that the mechanism can be completely closed and also made waterproof, by installing a tube (not shown) on the external circumference between the conical wheels 3, 4, equipped with suitable gaskets, which anyway allows a free rotation of the mechanism, which closes the room interposed between the wheels 3, 4. Of the conical wheels 3, 4, one (4) is the driving wheel and receives a motion to be transmitted, the other (3) is the driven wheel and, due to the control system through the central axis 13, becomes the carrier hub of a traction wheel of the means on which the gearbox of the invention is used.

The invention claimed is:

1. A gearbox with gears, comprising:
   a driving wheel and a driven wheel, the driving wheel and the driven wheel rotating on a common shaft, and with a cursor arranged transversely to the common shaft of the driving wheel and the driven wheel and sliding with respect to the driving wheel and the driven wheel,
   wherein the driving wheel has a surface facing the driven wheel and the driven wheel has a surface facing the driving wheel,
   wherein the driving wheel has crown gears arranged on different diameters of the driving wheel, and the crown gears of the driving wheel have teeth protruding from the surface of the driving wheel facing the driven wheel,
   wherein the driven wheel has crown gears arranged on different diameters of the driven wheel, and the crown gears of the driven wheel have teeth protruding from the surface of the driven wheel facing the driving wheel,
   wherein the cursor has a first end and a second end opposite the first end and further comprises a first gear arranged at the first end of the cursor and a second gear arranged at the second end of the cursor,
   wherein the cursor has an axis and the first gear at the first end of the cursor and the second gear at the second end of the cursor rotate around the axis of the cursor and are configured for transmitting motion from the driving wheel to the driven wheel,
   wherein the first gear at the first end of the cursor engages in one of the crown gears of the driving wheel arranged on different diameters of the driving wheel and the second gear at the second end of the cursor engages in one of the crown gears of the driven wheel arranged on different diameters of the driven wheel, and
   wherein the cursor slides inside a seat formed in the common shaft of the driving wheel and the driven wheel.

2. The gearbox according to claim 1, wherein the common shaft of the driving wheel and the driven wheel is fixed and the first and second gears of the cursor are integral with each other and fixed to a shaft of the cursor that defines the axis of the cursor.

3. The gearbox according to claim 1, wherein the surfaces of the driving wheel and the driven wheel are each conical in shape, inclined with respect to an axis defined by the common shaft of the driving wheel and the driven wheel by an angle.

4. The gearbox according to claim 3, wherein the axis of the cursor has an inclination relative to the axis defined by the common shaft, and wherein the angle of the surfaces of the driving wheel and of the driven wheel relative to the axis defined by the common shaft is equal to an angle of the inclination of the axis of the cursor relative to the axis defined by the common shaft.

5. The gearbox according to claim 1, wherein the driving wheel and the driven wheel mirror each other.

6. The gearbox according to claim 1, wherein the common shaft of the driving wheel and of the driven wheel is fixed and has the task of supporting the rotation of the driving wheel and of the driven wheel and of guiding the sliding of the cursor.

7. The gearbox according to claim 1, wherein the driving wheel is movable, the driven wheel is fixed, the common shaft of the driving wheel and of the driven wheel rotates with the cursor and the first and second gears of the cursor act as satellites.

8. The gearbox according to claim 1, wherein the gearbox further comprises means for controlling the axis of the cursor configured to move the cursor upwards or downwards along the axis of the cursor by a distance equal to the distance between the crown gears of the driving wheel or driven wheel to obtain a change in rotation speed of the driven wheel with respect to the driving wheel.

9. The gearbox according to claim 1, wherein the cursor is designed to be moved by a cursor moving mechanism, which is housed in the common shaft of the driving wheel and the driven wheel, a movement of the cursor being performed manually by means of levers, rack rods, or gears.

10. The gearbox according to claim 1, wherein the cursor is designed to be moved by a cursor moving mechanism, which is housed in the common shaft of the driving wheel and the driven wheel, a movement of the cursor being performed automatically by using an electric motor or sliding magnets.

* * * * *